United States Patent [19]
Bare

[11] Patent Number: 6,151,635
[45] Date of Patent: Nov. 21, 2000

[54] ROUTER CONNECTIONS THROUGH SWITCHING NETWORKS USING VIRTUAL CIRCUITS

[75] Inventor: Ballard C. Bare, Auburn, Calif.

[73] Assignee: Hewlett-Packard Company, Palo Alto, Calif.

[21] Appl. No.: 08/084,668

[22] Filed: Jun. 29, 1993

[51] Int. Cl.[7] .................................................. G06F 15/173
[52] U.S. Cl. .......................................... 709/241; 370/397
[58] Field of Search .................................. 370/94.1, 94.2, 370/94.3, 60, 17, 61.1, 84, 85.1, 82, 79, 54, 14, 58.2, 110.1, 95.1, 85.13, 16, 945, 396, 397, 412, 419, 392; 395/200, 500, 250, 255, 800; 340/826, 825.52, 825.04; 379/221; 709/241, 238; 710/131

[56] References Cited

U.S. PATENT DOCUMENTS

| | | | |
|---|---|---|---|
| 4,823,338 | 4/1989 | Chan et al. | 370/85 |
| 4,905,233 | 2/1990 | Cain et al. | 370/94.1 |
| 5,163,045 | 11/1992 | Coram et al. | 370/60.1 |
| 5,274,643 | 12/1993 | Fisk | 370/94.1 |
| 5,289,536 | 2/1994 | Kokari | 379/221 |
| 5,317,566 | 5/1994 | Joshi | 370/60 |
| 5,351,237 | 9/1994 | Shinohara et al. | 370/58.3 |

OTHER PUBLICATIONS

Request for Comment No. 1009 issued by the Internet Engineering Task Force (IETF).

Two unpublished slides from Hewlett–Packard Company Marketing which described a product which allows interconnection of user endnodes through ISDN.

*Primary Examiner*—Larry D. Donaghue

[57] ABSTRACT

A router routes data packets between local area networks. Upon receiving data packets, the router detects a destination for the data packets. Router processing circuitry within the router searches a routing table to obtain a routing table entry for the destination. When the routing table entry indicates that a virtual circuit is to be used to pass the data packets to a next hop router, the router obtains a phone number for the next hop router. The router then uses the phone number to establish connection with the next hop router over a switching network. The router then transfers the data packets to the next hop router over the established connection.

4 Claims, 4 Drawing Sheets

ROUTER CONNECTIONS THROUGH SWITCHING NETWORKS USING VIRTUAL CIRCUITS

BACKGROUND

The present invention concerns the interconnection of routers through switching networks using virtual circuits.

Communication between computers and other computing equipment is achieved through various types of networks. For computers and computer equipment within fairly close proximity, local area networks are often connected using a local area network (LAN). For computers and computer equipment separated by a greater distance, wide area networks (WAN) may be used to make the connections.

Often LANs and/or WANs are connected together in order for one computer on a LAN or a WAN to communicate with another computer in a different LAN or WAN. LANs and WANs may be joined, for example, using a network bridge or a network router.

For general information on routers see Request for Comment Number 1009 issued by the Internet Engineering Task Force (IETF).

SUMMARY OF THE INVENTION

In accordance with the preferred embodiment of the present invention, a router is presented which routes data packets between local area networks. Upon receiving data packets, the router detects a destination for the data packets. Router processing circuitry within the router searches a routing table to obtain a routing table entry for the destination. When the routing table entry indicates that a virtual circuit is to be used to pass the data packets to a next hop router, the router obtains a phone number for the next hop router. The router then uses the phone number to establish connection with the next hop router over a switching network. The router then transfers the data packets to the next hop router over the established connection.

In the preferred embodiment of the present invention the router keeps phone numbers for virtual connections within virtual map connecting table entries stored as part of a virtual map connecting table. Also in the preferred embodiment, each router may have a plurality of virtual circuits through which to send the data packets. Each virtual circuit is connected to the switching network via an adapter/modem connected to the router. The switching network may be, for example, an Integrated Services Digital Network. Alternately, the switching network can be an ordinary dial-up phone system.

By associating a cost with each entry in a router table, it is possible to utilize virtual circuit connections as back-up connections for a primary network. For each destination, two entries may be stored in the routing table. One route, assigned a lower cost, maps a route to the destination using the primary network. A second route, assigned a higher cost, maps a route to the destination using a virtual circuit to transfer data through a switching network. Under normal conditions the lower cost will result in data packets being routed through the primary network. When a connection of the primary network is broken, the router will transfer data packets through the virtual circuits using the switching network.

DESCRIPTION OF THE PREFERRED EMBODIMENT

Figure 1:
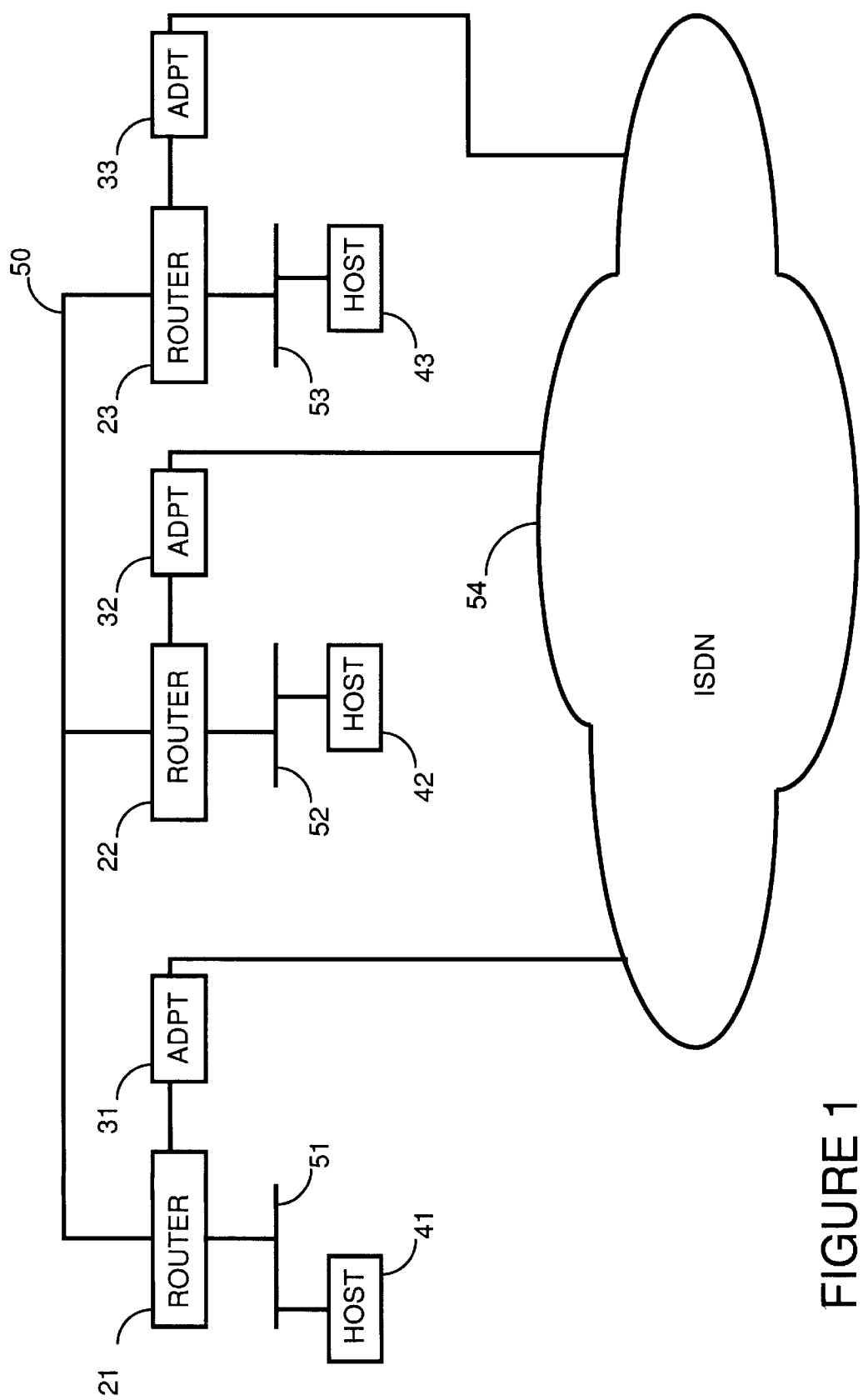
FIG. 1 shows a communications network, in accordance with the preferred embodiment of the present invention.

FIG. 1 shows a network connected in accordance with a preferred embodiment of the present invention. A router 21, a router 22 and a router 23 are connected to a primary network 50. Router 21 is connected to a local area network (LAN) 51. Also shown connected to LAN 51 is a host 41. In addition other computers and computer devices may be connected to LAN 51. Router 22 is connected to a LAN 52. Also shown connected to LAN 52 is a host 42. In addition other computers and computer devices may be connected to LAN 52. Router 23 is connected to a LAN 53. Also shown connected to LAN 53 is a host 43. In addition other computers and computer devices may be connected to LAN 53.

In addition router 21, through an adapter/modem 31 is connected to an Integrated Services Digital Network (ISDN) 54. Likewise, router 22, through an adapter/modem 32 is connected to ISDN 54. Router 23, through an adapter/modem 33 is also connected to ISDN 54. In the preferred embodiment of the present invention, adapter/modem 31, adapter/modem 32 and adapter/modem 33 operate in accordance with V.25 bis CCITT standard call connect protocol. In other embodiments of the present invention other switching networks may be substituted for ISDN 54. For example, a regular phone network may be used to transfer.

Figure 2:
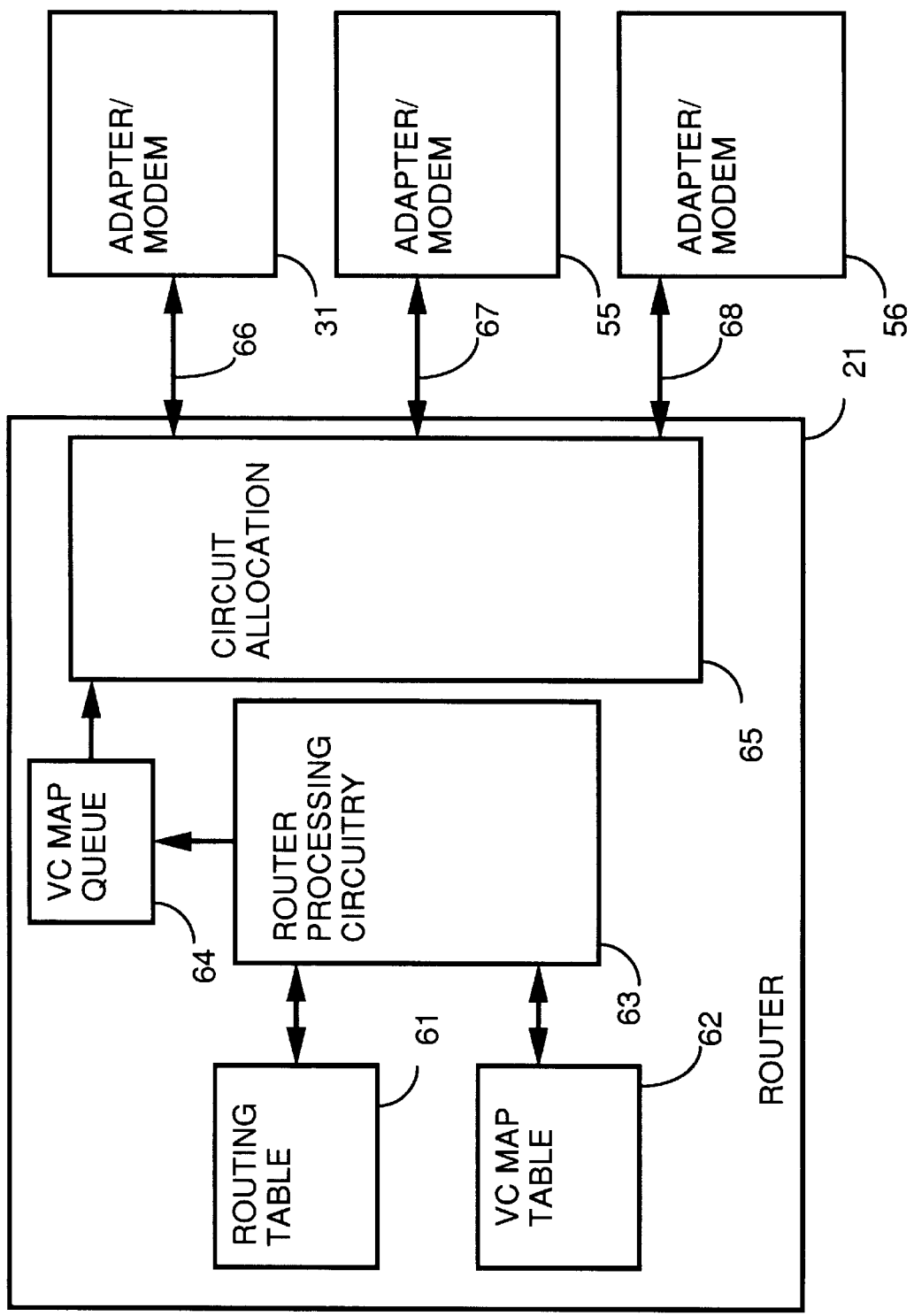
FIG. 2 shows a simplified block diagram of a router connected within the communications network shown in FIG. 1, in accordance with the preferred embodiment of the present invention.

FIG. 2 shows a simplified block diagram of router 21. Router 21 includes a routing table 61, a virtual connection (VC) map table 62, router processing circuitry 63, a VC map queue 64 and circuit allocation routine 65. Adapter/modem 31 is connected to router 21 through a virtual circuit 66. In the preferred embodiment, a router may have a plurality of virtual circuits. For example, as shown in FIG. 2, router 21 also includes a virtual circuit 67 which be used to connect router 21 to ISDN 54 via adapter/modem 55 and a virtual circuit 68 which be used to connect router 21 to ISDN 54 via adapter/modem 56.

Virtual circuits are circuits which represent routes which are not always connected. When a virtual circuit is utilized connection is established. In the preferred embodiment of the present invention, the virtual circuits transfer data over ISDN 54 using the V.25 bis CCITT standard call connect protocol. Routes which use virtual circuits are stored within routing table 61 as static routes. A static route is a route which is configured by a user as opposed to a route which is dynamically learned via a routing protocol such as Routing Information Protocol (RIP) or the Open Shortest Path First (OSPF). There are no extra status packets routinely sent across static routes. Further, there is no minimum amount of traffic required in order for static routes to continue to be listed in routing table 61. For more information on RIP, see the Request for Comment Number 1058 issued by the Internet Engineering Task Force (IETF). For more information on OSPF, see the Request for Comment Number 1253 issued by the Internet Engineering Task Force (IETF).

Figure 3:
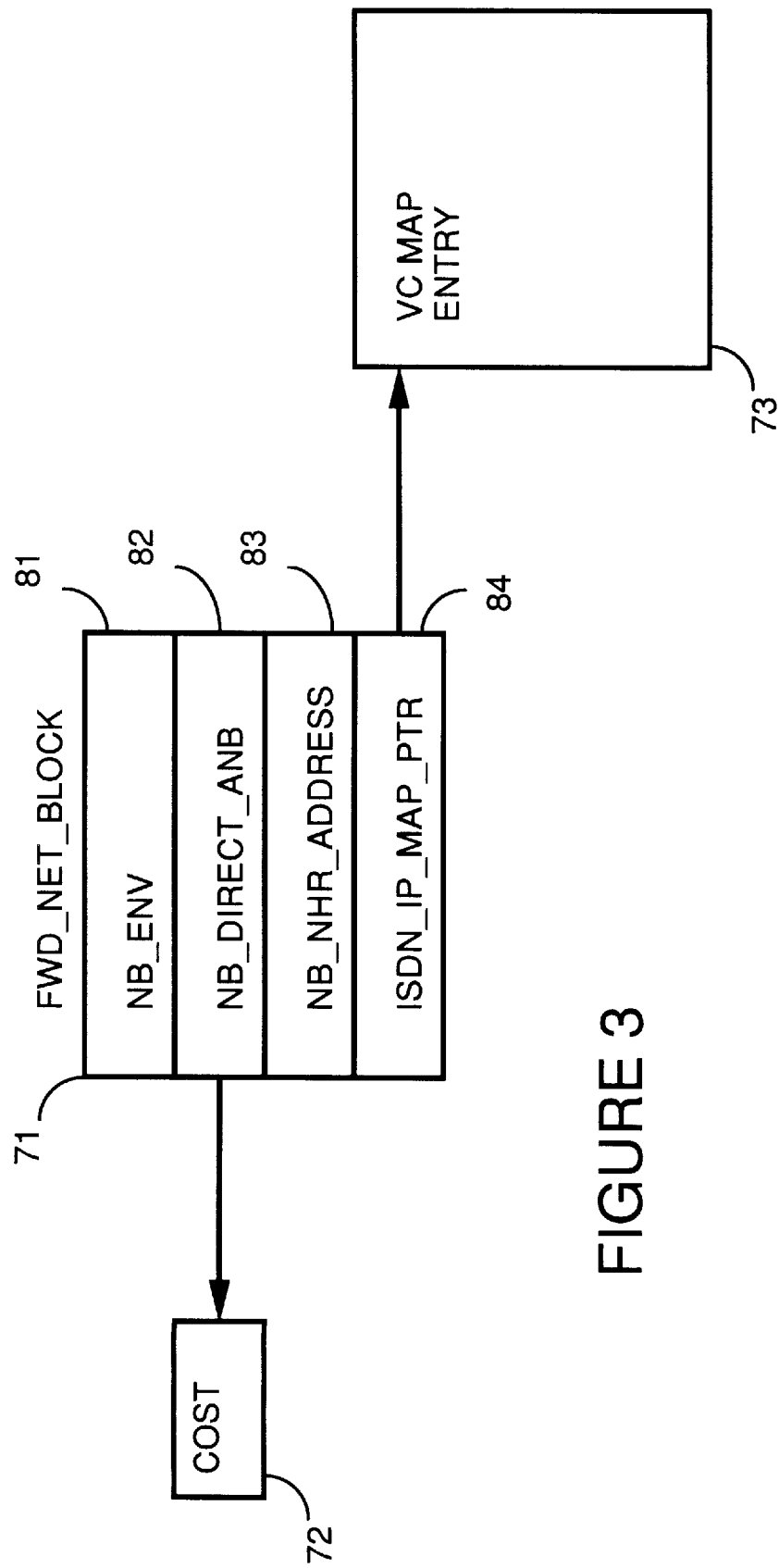
FIG. 3 shows the organization of an entry in a router table which is within the router shown in FIG. 2, in accordance with the preferred embodiment of the present invention.

FIG. 3 shows a simplified diagram of a FWD_NET_BLOCK entry 71 in routing table 61. Routing table 61 contains a FWD_NET_BLOCK entry for each destination network. Within routing table 61, the FWD_NET_BLOCK entries are linked together in a binary tree. The organization of the tree is performed using the address of remote networks. In one embodiment of the present invention, there may be more than one route to a destination. In this case two binary trees may be used. One tree includes all the routes. A separate forwarding tree includes just a single route with the lowest cost for each destination.

In FWD_NET_BLOCK entry 71, an NB_ENV element 81 is used for linking FWD_NET_BLOCK entry 71 into the binary tree. NB_ENV element 81 contains the address of the remote network for FWD_NET_BLOCK entry 71.

An NB_DIRECT_ANB element 82 is a pointer to the structure that contains information on the link cost and circuit group to access. In FIG. 3, this is illustrated by NB_DIRECT_ANB element 82 pointing to a cost value 72.

An NB_NHR_ADDRESS element 83 is the internet protocol (IP) address of the next hop router. For further information on IP see Request for Comment Number 791 issued by the Internet Activities Board.

An ISDN_IP_MAP_PTR element 84 contains a pointer to an ISDNIPMAP (VC map) entry in VC map table 62.

Figure 4:
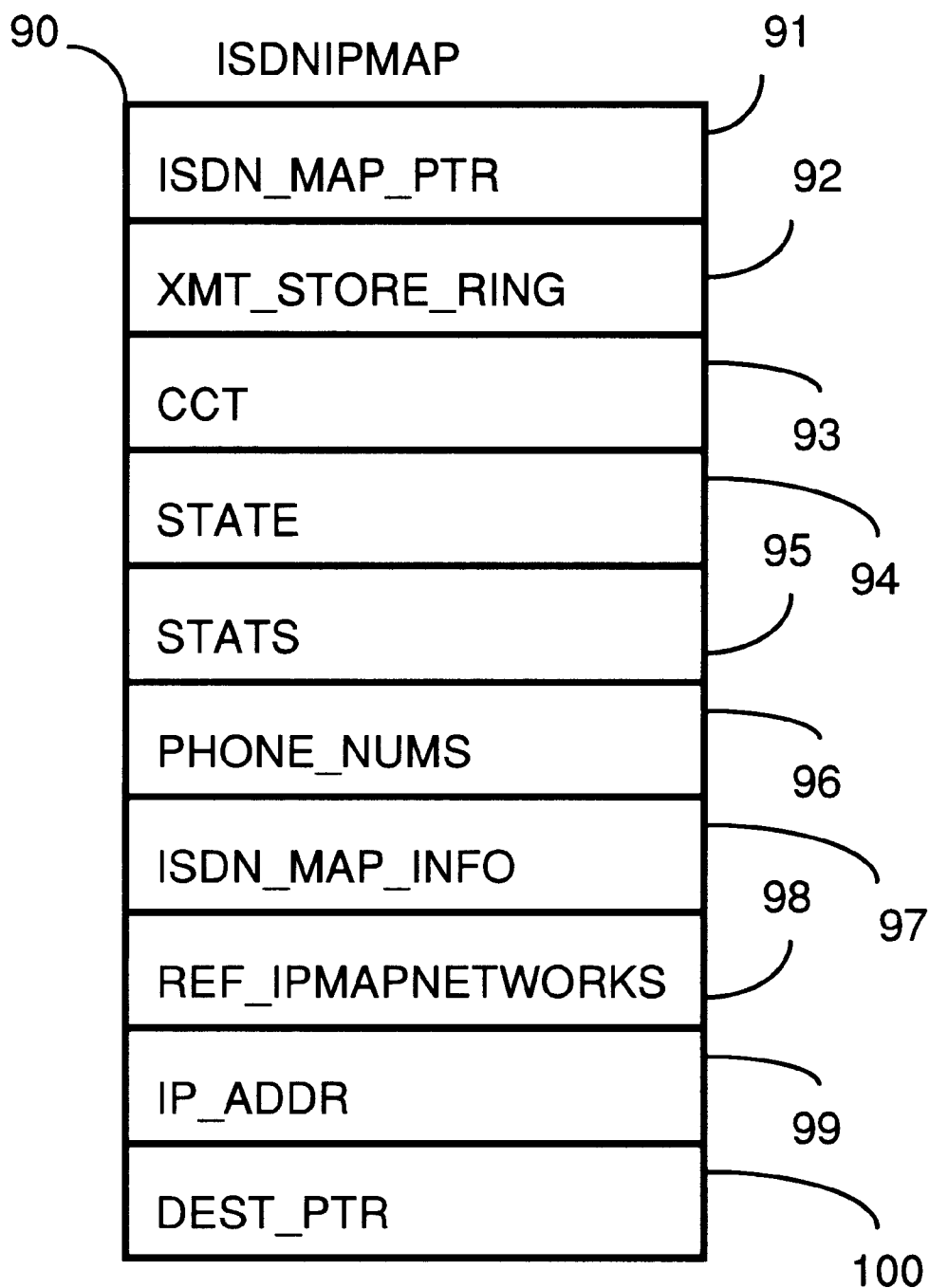
FIG. 4 shows the organization of an entry in a virtual circuit map table which is within the router shown in FIG. 2, in accordance with the preferred embodiment of the present invention.

FIG. 4 shows a simplified block diagram of a ISDNIPMAP (VC map) entry 90 in VC map table 62. An ISDN_MAP_PTR element 91 is used to link ISDNIPMAP entries together when ISDNIPMAP entries are in the hold down state (as described below). ISDN_MAP_PTR element 91 is also used to queue VC map entries while waiting for an available circuit, i.e., when the VC map entry is in the queue wait state as described in Table 1 below. An XMIT_STORE_RING element 92 is used to buffer packets while the ISDNIPMAP entry is in the connected state (as described below).

A CCT element 93 is the circuit number for a virtual circuit associated with ISDNIPMAP entry 90. CCT element 93 is filled in by circuit allocation routine 65 for outbound connections. For inbound connections, CCT element 93 is filled in by V.25 bis circuit routines.

STATE element 94 contains the state of ISDNIPMAP entry 90. The available states are as set out in Table 1 below:

TABLE 1

| | |
|---|---|
| Disconnected | VC map not currently in use |
| Connecting | VC map waiting for V.25 bis call to complete |
| Connected | VC map is active on a circuit |
| Queue Wait | VC map waiting for other map to finish with a pool circuit so it can use the circuit |
| Hold Down | VC map cannot be used until the hold down timer expires |
| Disabled | VC map has been disabled by user with a disable command or the connection failed and the hold down time was set to "Leave map down on failure". |

STATS element 95 contains status information on ISDNIPMAP entry 90. This includes, for example, the time connected and the number of packets sent, dropped and received. PHONE_NUMS element 96 contains the phone numbers to pass to the V.25 bis connect protocol. ISDN_MAP_INFO element 97 contains information configured for ISDNIPMAP entry 90. This is ,for example, timers and retry counts. REF_IPMAPNETWORKS element 98 points into the interconnect protocol (IP) management information base (MIB) and is used to store mapping information accessible to network management via the Simple Network Management Protocol (SNMP). IP_ADDR element 99 is the address of the next hop router configured in the static route. IP_ADDR element 99 is used to link the interconnect a FWD_NET_BLOCK entry to ISDNIPMAP entry 90 at start-up time. DEST_PTR element 100 is pointer to a link list of destination address accessible by ISDNIPMAP entry 90.

When a packet is received by router processing circuitry 63 from the data link service router processing circuitry 63 looks up a destination address for the packet in routing table 61. The data link service receives packets from the physical level and determines what level three protocol to pass the message to. In the preferred embodiment the level three protocol is IP. If the destination address can be reached by a static route associated with the virtual circuit map (VC Map), i.e., the ISDN_IP_MAP_PTR for the FWD_NET_BLOCK is not null, then the ISDN_IP_MAP_PTR is passed to circuit allocation routine 65. Circuit allocation routine 65 looks for an available virtual circuit over which to transfer a message. If the VC Map is already connected then no dialing is necessary and the data can be sent to the appropriate adapter/modem immediately. Otherwise, the data is placed on VC map queue 64. If circuit allocation routine 65 finds an available circuit, the phone number in PHONE_NUMS is passed to the circuit. If no circuits are currently available, circuit allocation routine 65 sets a short inactivity time on the circuit or circuits in use so that one of the circuits will relinquish the connection in a timely manner. When the circuit receives the phone number, the circuit will dial the number by using the V.25 bis protocol to the connected adapter/modem. When the adapter/modem has established the call, the circuit is informed via the v.25 bis protocol. This in turn triggers circuit allocation routine 65 to change the state of the VC map to connected Once connected, queued packets are sent in queue order. i.e., first-in first out (FIFO). If the connection fails to become established after a user configured amount of time, the map is disabled, the queue is flushed and this path is removed from the routing table for the map hold down time. This prevents a circuit from continuously retrying on a remote that it cannot reach at present. During the hold down time the routing protocol will check for other higher cost routes to the destination and use them if they exist. In the preferred embodiment of the present invention, the hold-down time is user selected. The user also has the option of leaving a map down if it fails to connect. In this case the map cannot be used until an enable command is issued by the user.

On an inbound packet, router processing circuitry 63 will look up the received phone number (if any) and scan all the VC map entries for a matching phone number in PHONE_NUMS in the VC map entry. A global array that contains all the map pointers is used to access each VC map entry. If the phone number is found in a VC map entry, the VC map entry is associated with the circuit by placing the circuit number in CCT element 93. Additionally, the STATE element 94 for the VC map is changed to "Connected". If the inbound phone number is not received by router processing circuitry 63, the VC map entry may still be associated with the circuit after the connection is established if the source address of the packets matches a destination linked to the VC map entry. To do this routing table 61 is searched for the destination address. If the forward block for the destination address (i.e., the ISDN$_{IP}$_MAP_PTR for the FWD_NET_BLOCK) points to a VC map entry with an appropriate entry in PHONE_NUMS, the VC map entry is associated with the circuit by placing the circuit number in CCT element 93.

Since the VC map entries are each associated with a static route in routing table 61, information about the route described by the VC map entry can be propagated to all routers in the network via routing protocols such as Routing Information Protocol (RIP) or the Open Shortest Path First (OSPF). This allows the router to use the VC map entries as back-up routes or primary routes based on the user configured cost of the routes.

For example, in the example shown in FIG. 1, routes between router 21, router 22 and router 23 which travel through primary network 50 each have a user defined cost value 72 of 2. On the other hand routes between router 21, router 22 and router 23 which travel through ISDN 54 using VC maps each have a user defined cost value 72 of 5. When more than one route is available, router processing circuitry 63 selects routes based on the cost function. In the normal case, because of the cost function, router 21 will route data through primary network 50. If primary network 50 goes down, router 21 will rout data through ISDN 54 using the virtual circuits.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A router comprising:

router processing circuitry for routing data transferred between local area networks;

a routing table, accessed by the processing circuitry, the routing table including
a plurality of routing table entries, each routing table entry including an address for a next hop router, and a reference to a cost value for a route represented by the table entry;

a virtual connection map table accessed by the routing processing circuitry, the virtual connection map table having a plurality of virtual connection map table entries, each virtual connection map table entry having a phone number for a next hop router, wherein for each virtual connection, a routing table entry includes a reference to a virtual connection map table entry;

a plurality of virtual connection circuits;

a virtual connection map queue onto which the router places data packets to be transferred through the virtual connection circuits; and, circuit allocation routines, coupled to the plurality of virtual connection circuits and to the virtual connection map queue, for selecting a virtual connection circuit from the plurality of virtual connection circuits over which to transfer data packets from the virtual connection map queue.

2. A router used to route data packets between local area networks, the router comprising:

a routing table;

searching means, connected to the routing table, for searching the routing table to obtain a routing table entry for a destination for the data packets, the searching means including selecting means for selecting a routing table entry with a lowest associated cost value when the routing table contains more than one routing table entry for the destination; and, virtual circuit means for passing the data packets to a next hop router when the routing table entry indicates that a virtual circuit is to be used to, virtual circuit means including
virtual circuit mapping means for obtaining a phone number for the next hop router,
virtual circuit means for establishing connection with the next hop router over a switching network, and
transferring means for transferring the data packets to the next hop router;

wherein the virtual circuit means includes
a plurality of virtual connection circuits,
a virtual connection map queue onto which the router places data packets to be transferred through the virtual connection circuits, and
circuit allocation routines, coupled to the plurality of virtual connection circuits and to the virtual connection map queue, for selecting a virtual connection circuit from the plurality of virtual connection circuits over which to transfer data packets from the virtual connection map queue.

3. A router as in claim 2 wherein each virtual connection circuit is connected to a switching network through an adapter/modem.

4. A router as in claim 3 wherein the switching network is an Integrated Services Digital Network.

* * * * *